United States Patent [19]
Logue

[11] 3,897,972
[45] Aug. 5, 1975

[54] REINFORCED DUMP BODY

[76] Inventor: George E. Logue, 321 Winters Ln., Montoursville, Pa. 17754

[22] Filed: Oct. 29, 1973

[21] Appl. No.: 410,323

[52] U.S. Cl. ............................ 296/28 D; 298/1 H
[51] Int. Cl. ............................ B60p 1/28; B60h 1/18
[58] Field of Search ............... 298/1 H, 17 R, 23 R; 296/28 M, 28 D, 39 A, 39 R; 105/261 R, 261 A, 414, 418, 451, 264, 265, 266, 267, 423

[56] References Cited
UNITED STATES PATENTS

| | | | |
|---|---|---|---|
| 1,942,207 | 1/1934 | Ferwerda | 298/1 H |
| 1,980,787 | 11/1934 | Dayes | 296/39 A |
| 2,756,095 | 7/1956 | Schnell | 298/1 H |
| 2,859,709 | 11/1958 | Flowers | 296/28 D |
| 3,472,548 | 10/1969 | Comisac | 296/28 D |
| 3,499,678 | 3/1970 | Richter | 296/28 D |

*Primary Examiner*—M. Henson Wood, Jr.
*Assistant Examiner*—Reinhard J. Eisenzopf
*Attorney, Agent, or Firm*—Lowe, King & Price

[57] ABSTRACT

A dump body for a truck is provided having a plurality of longitudinal channel members extending along the floor of the body, a 45° upturned flange extending along the sides of the floor, said flange cooperating with a formed channel along the lower edge of the sides to provide a box rail along the corners of the box. Tapered buttresses extend from the top of the side walls down to the upper face of the corner rails merging smoothly with both. Cross supports extend from the lower inside face of the corner rail to the extended inner sills for the dump body, the supports also merging smoothly with both elements. The inner sills are extended downwardly to provide additional reinforcement at the point of the maximum stress and the extension of the cross supports, corner rails and buttresses form a full C-clamp structure in cross section for the box. An inside top rail is provided and plywood sheet insulation extends from the bottom thereof to the top of the edge flange of the floor. Heat is advantageously provided along the floor by introduction into a rear manifold adjacent the discharge edge of the box to give maximum effectiveness. A discharge manifold is provided adjacent the front of the box for release of the hot gases to the atmosphere.

10 Claims, 3 Drawing Figures

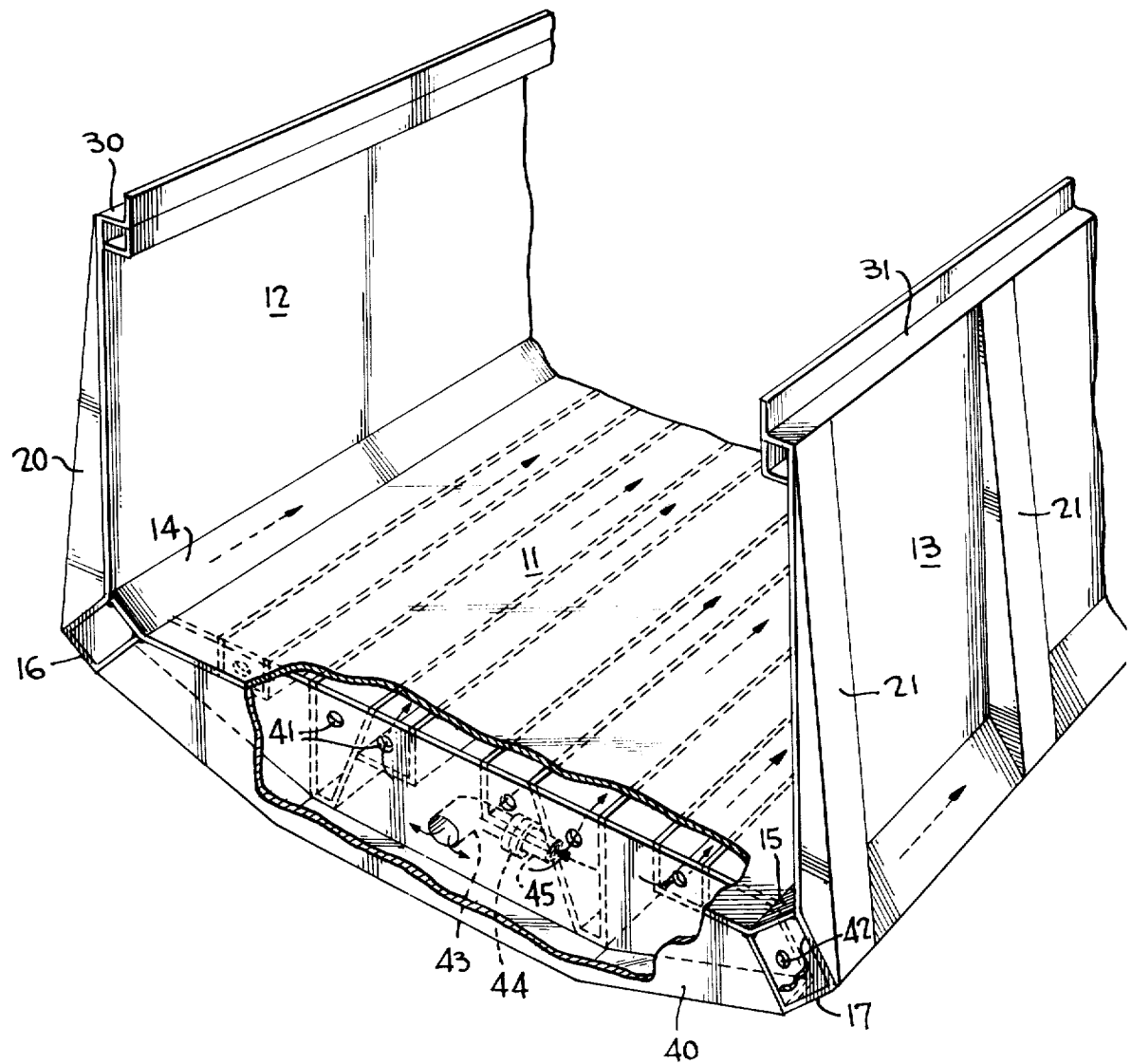

REINFORCED DUMP BODY

FIELD OF THE INVENTION

The present invention relates to vehicle bodies, and more particularly to an improved reinforcement structural design for dump bodies.

BACKGROUND OF THE INVENTION

Dump bodies of today are designed to carry ever increasing amounts of payload in order to make construction operations more economical. However, the structural design of the reinforcement of dump bodies has remained substantially unchanged during the last two decades. There has been shown a need to improve the strength of the dump body and at the same time cut the cost of manufacturing.

The specific prior art structural design for the reinforcement of the body of which I am aware, employs a plurality of transversely extending beams that are attached across the width of the floor of the body. Originally, these cross members were made of I-beams or the like that are equal in cross section across the full width of the floor. Recently, these I-beams have been replaced by channel members that extend across the underneath side of the floor. With the advance of using channels, or box section members, it has become customary to pass heated gases through these members in order to heat the floor and allow easier dumping operations even in the coldest climates. An example of this latest development is the design shown by the patent to Comisac, U.S. Pat. No. 3,472,548, issued Oct. 14, 1969. While the concept of using closed reinforcement members and passing heated gas through these members is thus a known technique, there remains certain serious shortcomings in this prior design.

First, the channel members running transversely across the floor, especially at the center of the body, tend to cause the formation of transverse dams across the floor bottom hindering easy discharge after a period. Furthermore, the channel members have heretofore been designed as constant height members so that the parts are either over-designed at the lateral edges of the body to accommodate the excess stress that occurs at the center of the body, or the body is inherently weak due to under-design of the reinforcement members. Furthermore, the prior art has maintained the concept of introducing the heating gases either at the front of the dump body or at the intermediate point and allowing the gases to flow from the intake toward the rear for exhaust to the atmosphere. This heating concept allows transfer of insufficient heat to the most critical point on the dump body floor, i.e., at the rear edge where all of the material must pass in order to be discharged from the body.

OBJECTIVES OF THE INVENTION

Thus, it is a main object of the present invention to provide a new structural design for a truck body having improved strength characteristics and also being more compact and less expensive to fabricate.

It is another object of the present invention to provide a reinforcement structure for a dump body wherein the main cross-sectional reinforcement is accomplished by a C-clamp principle and the strength to weight ratio is maximized.

It is still another object of the present invention to provide a reinforced dump truck body wherein the corner rails are fabricated integrally with the side walls and the floor and form an integral part of the C-clamp reinforcement of the body.

It is another and related object of the present invention to utilize the longitudinal reinforcement members and the hollow corner rails to distribute heat along the full length of the body after being first introduced in a manifold positioned at the rear edge of the body.

BRIEF DESCRIPTION OF THE INVENTION

The present invention is an improvement over previous designs of dump truck bodies in several respects. The first feature that should be mentioned is concerned with the improved reinforcement of the sides and floor of the body that makes the body stronger than previous designs and also less expensive to build and relatively lighter in weight. The concept employed is the provision of particular structural reinforcing members that form a full or continuous C-clamp design across the floor and up the two sides where the load is in effect being held. The improved strength characteristics prevent the sides from bowing out under fully loaded conditions of the truck.

The design employs longitudinal reinforcement members underneath the floor, which members are the only one directly attached to the floor forward of the rear edge and thereby afford the advantages including the prevention of forming dams, as set forth in my previous application entitled "Reinforced Dump Truck Body", Ser. No. 350,092, filed Apr. 11, 1973, now abandoned. A longitudinal flange integral with the floor is turned upwardly along the sides and an outside channel rail is formed integrally with the side walls and together a rectangular, specifically a square, corner rail is formed. Extending upwardly from the corner rail are a plurality of tapered side buttress members. These members merge smoothly with the corner rail and the top of the side walls and form the upper and lower legs of the C design.

One of the longitudinal reinforcement members is an extended height sill member and cross supports are provided tapering from the sill outwardly to the lower face of the corner rail. These cross supports form the side of the C in the design concept. In short, the cross supports, corner rails and buttress members, all interconnected and merging smoothly with each other serve to form a cross section of a dump truck body that has superior strength characteristics and is a noted improvement over pior designs.

A top rail extends along the upper side walls of the body and forms the terminals of the upper and lower parts of the C design and serves to tie these structures together. The top rails include an inwardly directed integral lip on the side wall and a cooperating angle piece attached to the inside of the wall to form a box section. Plywood sheet insulation may be attached to the side walls below the top rail and with the bottom edge being positioned adjacent the raised outer edge of the side flanges on the floor. In this manner, the insulation sheet is protected from water entering both the top and bottom edges.

An additional feature of the longitudinal members is concerned with the incorporation of two effective channel members with the requirement of only three longitudinal walls extending along the bottom of the body. One of these members serves as the longitudinal sill member. The inner side face of the sill extends at an oblique angle to the floor and an angle reinforcement member is attached thereto thereby forming the two channel sections with a common middle leg. Split I-beam sections are used for the intermediate cross supports with the end of the beams extending across the full expanse of the lower side face of the channel rail and the outer side face of the inner sill member thereby giving maximum reinforcement to the structure.

A related feature of the reinforcement structure is concerned with a new advantageous means for heating the floor of the truck. An inlet manifold is attached underneath the floor at the rear edge so that maximum heating is realized at this critical point. The heat applied to the rear edge allows the material to slide freely when the body is dumped. As can be realized, if sticking or freezing occurs at the rear edge, none of the material in the box can be dumped so that the criticality of this point can be readily recognized. The manifold has orifice means formed so as to interconnect with the rear ends of the longitudinal channel members to thereby conduct the heat toward the front of the truck. This arrangement assures proper dumping action of asphalt and all other wet materials in freezing weather. The corner rail is also interconnected to provide heat along the upturned flanges at the edge of the floor. The heated fluid is introduced into the channel at the center where the depth is the greatest so that this design gives minimum back pressure. The extra depth also assures the maximum strength at the center of this rearmost C-clamp support of the body. The heated fluid is exhausted at the front of the body through a manifold formed by a gusset plate extending along the front edge with the outlet orifices being formed in the floor and the side flanges.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWING

FIG. 3 is a rear perspective of the dump body showing the inlet manifold feature for the heating system.

DETAILED DESCRIPTION OF THE PREFERRED EMBODIMENT

Figure 1:
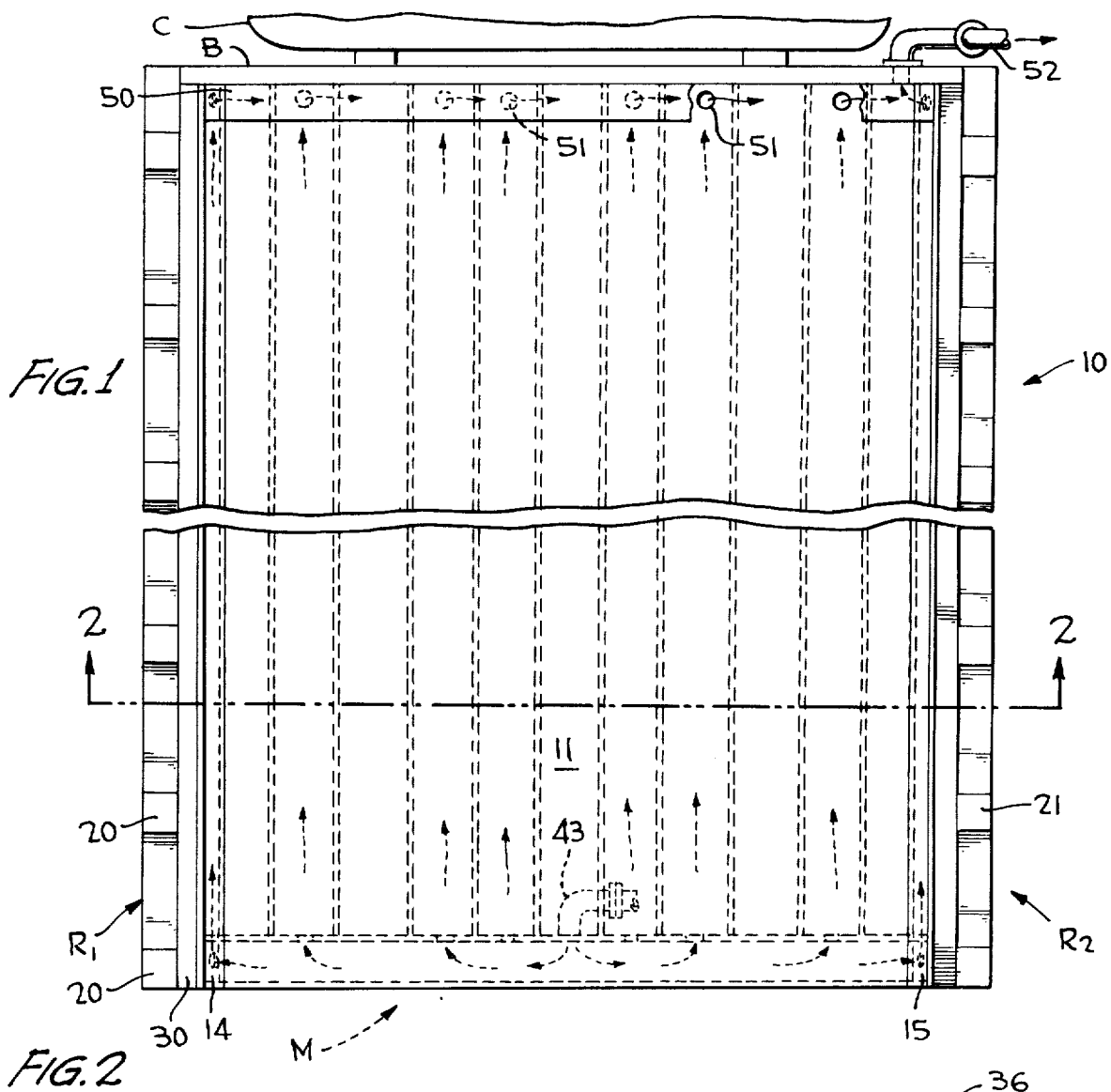
FIG. 1 is an overall plan view of the truck body built in accordance with the teachings of the present invention.
Figure 2:
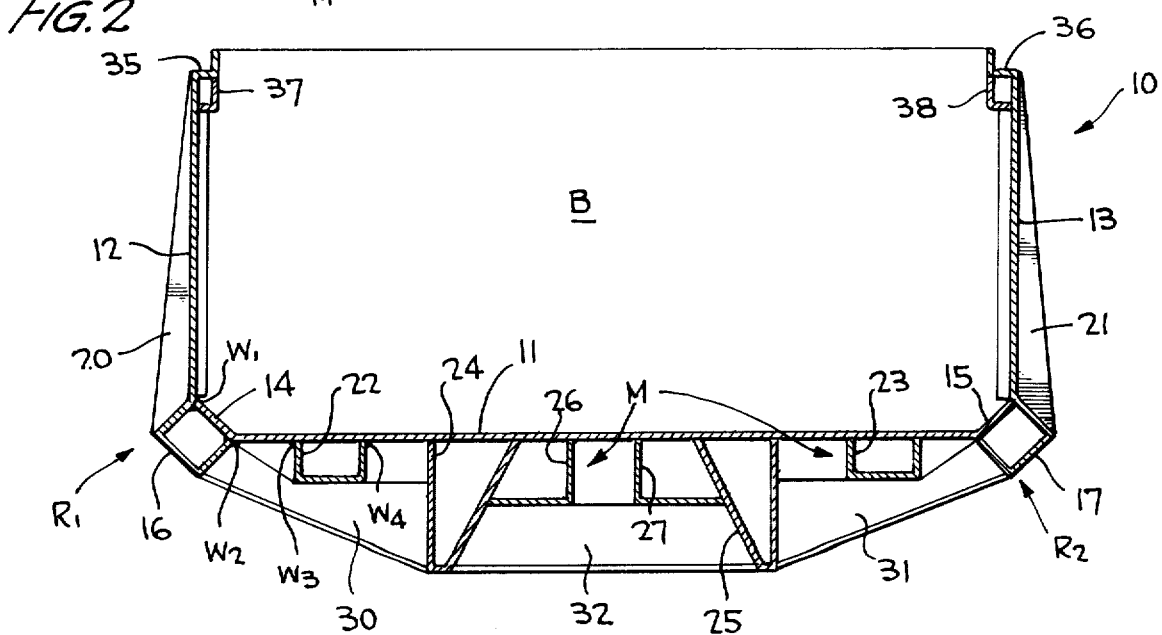
FIG. 2 is a cross-sectional view taken along lines 2—2 of FIG. 1 showing an intermediate cross support utilizing the C-clamp concept.

With reference now to FIG. 1 of the drawings, and considering in conjunction therewith the cross-sectional view of FIG. 2, the first main concept of the present invention can be viewed. The figures show a reinforced dump body, generally designated by the reference numeral 10 which body 10 can be mounted on any conventional truck chassis with cab C (partially shown in FIG. 1). The improved body 10 includes a floor plate 11 and side walls 12, 13. A bulkhead member B may be provided at the front of the body 10, and a tailgate (not illustrated) at the rear. A plurality of longitudinally extending reinforcement members, shown by dashed line outlines in FIG. 1, and shown in cross section in FIG. 2 (generally designated by reference indicia M) are welded to the underneath surface of the floor at each point that they intersect. The present application is not concerned with the broad concept of longitudinal reinforcement since this is covered in my previous application, supra; however, as will be appreciated as the description develops herein, certain improvements have been made and described herein that enhance the structural strength of this basic design and further make use of these members for especially favorable heat transfer to the floor of the truck.

An important structural concept of the present invention is the provision of a fabricated body that is not only stronger and more rigid, but is capable of being more efficiently manufactured on a production basis. Furthermore, with the concept comes a more compact outer profile giving advantages in terms of maneuvering the truck in tight places. Thus, the floor 11 is formed with a pair of lateral flanges 14, 15 along the edges of the dump body 10. These flanges 14, 15 extend upwardly at an angle of approximately 45° and are conveniently fabricated as an integral part of the floor 11 in the manufacturing process by simply subjecting the plate forming the floor 11 to a bending action in a conventional machine. Similarly, the side walls 12, 13 are bent to form a cooperating channel rail 16, 17 as an integral part of said side walls 12, 13 at the lower edge thereof. The formed parts are connected by only two butt welds w1, w2 (see lefthand side of FIG. 2) and the sides and floor are thereby interconnected with strong box section reinforcement at the critical corner areas of the cross section. These corner rails, generally designated by reference numerals R1, R2, form an important element in the C-clamp structure design for reinforcement of the body 10.

A plurality of tapered side buttress members 20, 21 are welded to the side walls 12, 13 to reinforce the same. It will be noted in FIG. 2 particularly, that the bottom of the buttress members 20, 21 are attached to the upper face of the corner rails R1, R2 and merge smoothly therewith. The top of the buttress members merge smoothly with the upper edge of the side walls and taper downwardly to the rails.

The beginning of the C-clamp structure (top and bottom of the C) can now be seen, and the feature of conservation of material with maximum strength can be realized. The corners are provided with the strongest and yet the most compact reinforcement when the rails R1, R2 are made square in cross section, which is important since the maneuverability of the truck is thereby enhanced. As the top of the walls is approached, the reinforcement required is less, and further compactness is desired, and thus the buttress members 20, 21 are advantageously tapered as shown.

The longitudinal members M may specifically include channels 22, 23 attached by weldments at points w3, w4 along the underneath side of the floor 11. Spaced inwardly from the channel members 22, 23 are a pair of sill members 24, 25. These members are also attached by welding at the intersection of the legs with the underneath surface of the floor 11, as will be clear. These sill members provide the point of supporting the dump body on the chassis of the truck (not shown). Furthermore, since these members are adjacent the center, they are larger, that is extend downwardly a distance greater than the channel members 22, 23. The sill members 24, 25 thus delineate the middle section or the side of the C-clamp cross-sectional structure of the present inventive concept.

Positioned to the inside of the sill members 24, 25 are angle reinforcing members 26, 27 that are also attached by welding. These are attached after the sill members have been placed in position. The welding is performed along one leg of the angles that cooperates with the floor 11 and along the other leg that cooperates with the oblique side of the sill members 24, 25. With this arrangement, support in the critical center section of the truck is enhanced while maintaining the strength-to-weight ratio of the C structure at the highest level. In the sill and angle member combination, two channel areas are provided with a common middle leg which maximizes the strength for the weight of the parts involved, and also this arrangement requires a minimum of attachment edges, and thus a minimum of welds. The rails R1, R2 and all of the longitudinal support members M serve to tie together the C-clamp structures described for still more advantageous reinforcement of the whole body 10.

To complete the C-clamp support structure, side cross supports 30, 31 are provided extending from the perpendicular leg of the sill members 24, 25 to the corresponding corner rails R1, R2. Extending across the center is an inner cross support 32 extending between the oblique side faces of the sill members 24, 25. It is most important to note that the ends of the cross supports 30–32 are fully attached by welding to the abutting part as described. With this arrangement, full supporting strength against bowing outwardly of the walls 12, 13 is realized since there is full compressive engagement from the top of the sides 12, 13 through, all the way to the center axis of the body 10. It is also emphasized how the parts fit together in an advantageous manner to provide a gradual increase in part size toward the center axis of the body 10 (side of the C), which faithfully follows the C-clamp principle.

The cross supports 30–32 are preferably split I-beams with the web of the I-beam being positioned at the bottom at the maximum lever arm where the greatest strength is needed. Note in particular also that the web of the buttress members 20, 21 and the web of the channel rails 16, 17 are likewise at the maximum lever arm, and with the webs of the I-beam members 30–32 form a continuous stress path around the full outer perimeter of the C reinforcement structure, thus putting the maximum metal at the most favorable location for effective support.

A top rail extending longitudinally along the upper side walls of the body 10 is provided to complete the reinforcement and to further tie the axially spaced C-member combinations together. Again, maximum efficiency is gained in the fabrication. Specifically, a box section, that has the most favroable strength characteristics, is made by turning in the upper edge of the side walls 12, 13 thereby forming flanges or lips 35, 36 and welding an L-shaped or angle piece 37, 38 in position as shown in FIG. 2.

Specific tests have been conducted in order to prove the strength characteristics of the C-clamp design concept. A hydraulic ram was placed on the inside of the truck body at several locations along the length thereof and positioned adjacent the top of the side walls or about 48 inches from the floor 11 of the truck. This position is where greatest deflection due to outward pressure of the wall occurs during normal use. A force of 2,000 pounds was applied and an average of only one-quarter inch of deflection was recorded in the tests of the new dump body design. A norm for prior art truck bodies can be considered as 1½ inches of deflection when tested at only 36 inches from the floor and 1,500 pounds of force are being applied. The superiority of the C-clamp design can readily be seen.

The area along the axial length having the greatest potential deflection on any dump body occurs at the rear edge of the body, since at this location there is no bulkhead or other means of support due to the presence of the tailgate. The new U-shaped tailgate designed by myself is disclosed and claimed in another previous application entitled "Tailgate For Dump Truck", Ser. No. 272,025, filed July 14, 1972. This problem is somewhat alleviated by my new tailgate design since the sides of the tailgate actually are operative to pull in the sides of the dump box to a certain degree if they are slightly spread by the load. However, even when using the new tailgate, the side walls 11, 12 must be retained against excessive deflection. With this in mind, a special integrated cross support combination is provided at the rear edge of the dump body to assure sufficient strength around the body at this point while also providing the important heating function. As shown in FIG. 3, the main member in this combination is cross support channel 40. This channel 40 serves as an inlet manifold for hot gas being channeled under the rear edge of the floor for assuring non-freezing, and thus, easy exit of the material from the dump box, and perhaps most importantly, for assuring against freezing of the tailgate in the closed position. It will be noted that the upper edges of the manifold 40 are fabricated so as to exactly fit the underneath rear edge of the floor 11, as well as the bottom side faces of the channel rails 16, 17. Apertures 41 are supplied along the inside face of the cross channel 40 and through these apertures 41 is finally passed the hot gas to the longitudinal channel members M for further direct heat transfer to the floor 11. However, again note the fact that the hot gas entering the channel-manifold 40 is directly exposed to the rear edge of the floor 11 in order that this strip will receive the greatest heat transfer. This virtually assures that even in severest weather that the rear edge of the floor 11 remains unfrozen and hot to allow easy opening of the gate and exit of the total amount of material in the box.

As mentioned, the apertures 41 cooperate with the enclosed channel passageways to pass the exhaust gas forward along the length of the truck body, and similar apertures 42 are provided in the channel rails 16, 17 to also allow direct heat transfer between the hot gas and the upstanding flanges 14, 15 of the floor 11. The gas passing from the rear to the forward part of the body, as denoted by the flow arrows in the figures, is thus applying the greatest heat transfer at the location where it is needed most. At the same time, it is providing a floor 11 that is heated over substantially 60 percent of the area and indirectly heated by conduction in the other areas by a sufficient amount. Because the cross channel 40 is at the very edge of the dump body 10, no adverse effect in terms of transverse grooves or dams in the floor 11 is likely. The greatest force on the floor tending to deform the same, is the initial dumping of the material into the box. Since little or no force is experienced at the edge directly adjacent the tailgate, the effects if any are minimal. Furthermore, since the rear edge is always kept at a hot temperature, the material will readily flow in this area where before problems of dam-forming sticking material where encountered.

The exhaust pipe from the truck engine to provide the heat for the floor of the truck enters the intake manifold 40 through any suitable pipe, such as pipe 43 shown in FIG. 3. Any type of insulation may be provided on the exhaust pipe from the engine and the outer surface of the members 40, M as desired, although normally the expense and maintenance of such is not justified by the increased heat transfer efficiency. A coupling 44 and a flexible section 45 (partially shown) are used in order to allow the dumping action. Alternatively, a special coupling could be positioned coaxial with the dump body support axis, as will be apparent. Since the intake pipe 43 is positioned at the center of the manifold 40, which extends down further than the ends, and therefore provides the greatest volume, the exhaust from the truck experiences minimal back pressure, thereby preventing damage to the valves and other parts of the engine.

A lateral gusset plate 50 is provided along the front edge of the floor 11 suitably welded to the floor 11 and the bulkhead B. The gusset plate 50 not only reinforces this forward edge of the body 10, but also advantageously forms an exhaust manifold for the gases as they reach the front of the body 10. Apertures 51 allow escape from the enclosed channels, whereupon the gases flow to the right along the triangularly shaped manifold and finally out a conventional exhaust pipe and muffler 52.

In view of the foregoing, it can be seen that the structure of the dump body 10 has many decided advantages over those set forth in the prior art. An exceptionally strong body is made by employing the novel C-clamp design for the body encompassing reinforcement combinations, while at the same time structural material is minimized for the highest possible strength-to-weight ratio. Actual tests have shown the lateral deflection of the walls 12, 13, which is the important parameter in dump truck body design is minimal in the design of the present invention. The design further is characterized by significant advances in terms of economy of manufacture since the corner rails R1, R2, as well as the top rails 35-38 are fabricated utilizing integral formed flanges and channels from the adjacent floor 11 and side walls 12, 13, respectively. A minimum number of welds w1-w4 are needed along the critical floor area. The buttress members 20, 21, the corner rails R1, R2 and the I-beam cross supports 30-32 form an exceptionally strong support around the outer rim of the body, as shown in FIG. 2, which support is continuous from the tip of one top rail to the tip of the other. The parts are exactly proportioned in terms of material directly to the force that must be resisted. Top rails 35-38 and the longitudinal members M tie in the support of the C-clamp combinations. The rearmost C-clamp assembly includes the channel-manifold 40, which not only gives exceptional strength at the critical rear edge, but also serves as an initial point for direct heating of the floor 11. By providing heat first to this area, the tailgate is assured of being free for opening and the load is assured of efficient exit when the body is lifted, as is experienced in extreme freezing climates with prior designs. The gas providing the heat runs from the rear toward the front so that the heating function is also provided over the remainder of the floor 11.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:

1. A reinforced dump body including two side walls having a top and bottom edge and a floor adjacent the bottom edge, the improvement comprising a plurality of longitudinal reinforcement members extending underneath the floor and attached along the upper edges to said floor, a longitudinal flange turned upwardly at approximately 45° along the sides, an outside channel rail adjacent the bottom edge, one of said channel rail and said flange being formed integrally with a respective one of said floor and said side walls, said channel rail mating with said flange and forming substantially a rectangular corner rail, a plurality of laterally tapered side buttress members extending from the top edge of said side wall downwardly to the upper face of said rail and merging smoothly with both, at least one inner sill member of said reinforcement members adjacent the longitudinal center of said floor extending below the others and said side rail, and cross supports for interconnecting said reinforcement members tapering from the lower face of said corner rail to the outer side face of said inner sill member and merging smoothly with both, whereby a full C-clamp structure is formed in cross section for said body by said cross supports, corner rails and buttress members for maximum strength and rigidity of said body.

2. The dump body of claim 1 wherein is further provided a top rail extending along the upper side walls of said body, said top rail being positioned on the inside face of said side walls and comprising an inwardly directed integral lip on said side wall and an angle piece attached to form a box section therewith.

3. The dump body of claim 2 wherein there is further provided plywood sheet insulation attached to the inside face of said side walls, the upper edge of said sheet being in juxtaposition with the top rail and the bottom edge being positioned adjacent the raised outer edge of said flange, whereby the sheet is protected from water entering both the top and bottom edges.

4. The dump body of claim 1 wherein said longitudinal reinforcement members comprise at least two inner sill members, the outer side face of each sill member being substantially perpendicular to said floor, the inner side face extending at an oblique angle and having an angle reinforcement member attached thereto, said sill member and said angle reinforcement member foring two channel sections with a common middle leg for maximization of strength with a minimum of attachment edges.

5. The dump body of claim 1 wherein said outside channel rail and said flange forms a square corner rail in cross section.

6. The dump body of claim 1 wherein said reinforcement members include at least two inner sill members extending below the others and said corner rail, the outer face of said inner sill member being substantially perpendicular to the floor and extending downwardly below the other reinforcement members, the inner face extending to an oblique angle, said cross supports being attached only to the lower face of said corner rail, the outer face of said sill members, and the lowermost face of said other reinforcement members, said reinforcement members being generally channel shaped, an angle reinforcement member along the inner face of said inner sill member, and a center cross support attached to said inner faces of said sill members and the lowermost face of said angle members.

7. The dump body of claim 1 wherein said cross supports are formed of split I-beam sections, the end of the beam extending across substantially the full expanse of the lower side face of said channel rail, and the opposite end of said beam being attached to the outer side face of said inner sill members.

8. A dump body having two reinforced side walls and a reinforced floor comprising a plurality of longitudinal reinforcement channel members attached to and extending underneath the floor, outside channel rails formed integrally with the side walls, a transversely extending inlet manifold attached underneath said floor at the rear edge thereof, said corner rail, said reinforcement members and said manifold being enclosed on the top side by the floor to form gaseous product passageways with direct heat transfer to the floor, means to introduce hot gas into said inlet manifold, orifice means formed in said manifold and interconnecting with the rear ends of the longitudinal channel reinforcement members and said corner rail to allow flow of fluid from the rear edge forwardly along the length of the body and exhaust means at the forward end of said channel members and said corner rail to release the gas, whereby the maximum heating occurs along the rear edge of the floor at said manifold and the gas is thereafter transferred the length of the floor to the front.

9. The dump body of claim 8 wherein said exhaust means comprises an outlet manifold extending along the front edge of said floor and communicating with outlet orifices in the floor, and an exhaust pipe at the front of said body connected to said outlet manifold to exhaust the gases to the atmosphere.

10. The dump body of claim 8 wherein said inlet manifold is formed by a transverse channel, said channel having sufficient strength and rigidity to form a reinforcement for the rear edge of said floor, the depth of the channel being greater at the center than at the ends for maximum strength at the point of maximum stress.

* * * * *